US008332260B1

(12) United States Patent
Mysen et al.

(10) Patent No.: US 8,332,260 B1
(45) Date of Patent: *Dec. 11, 2012

(54) AUTOMATICALLY ADAPTIVE PRICING FOR DIGITAL GOODS

(75) Inventors: Clarence C. Mysen, Menlo Park, CA (US); Johnny Chen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,346

(22) Filed: Mar. 16, 2012

Related U.S. Application Data (63) Continuation of application No. 11/857,296, filed on Sep. 18, 2007.

(60) Provisional application No. 60/826,045, filed on Sep. 18, 2006.

(51) Int. Cl.
*G06Q 10/00* (2006.01)
*G06F 21/00* (2006.01)
*G06F 17/00* (2006.01)
*H04N 7/167* (2006.01)

(52) U.S. Cl. ...... 705/7.35; 705/1.1; 705/7.29; 705/7.31; 705/7.32; 705/7.37; 705/28; 705/52; 705/400; 380/231

(58) Field of Classification Search ............ 705/1.1, 705/7.29, 7.31–7.32, 7.35, 7.37, 28, 52, 400; 380/231
See application file for complete search history.

(56) References Cited

U.S. PATENT DOCUMENTS

| 7,340,759 | B1 | 3/2008 | Rodriguez |
| 7,467,104 | B2 | 12/2008 | Schwartz et al. |
| 7,739,153 | B1 * | 6/2010 | Anderson et al. ........ 705/26.64 |
| 7,970,665 | B1 * | 6/2011 | Lifson ...................... 705/26.7 |
| 2002/0083456 | A1 * | 6/2002 | Bates et al. .................. 725/60 |
| 2002/0095327 | A1 | 7/2002 | Zumel et al. |
| 2002/0120589 | A1 * | 8/2002 | Aoki .......................... 705/400 |
| 2003/0023505 | A1 | 1/2003 | Eglen et al. |
| 2003/0126097 | A1 | 7/2003 | Zhang et al. |
| 2003/0187749 | A1 * | 10/2003 | Peled et al. ................. 705/26 |
| 2004/0068451 | A1 | 4/2004 | Lenk et al. |
| 2004/0249643 | A1 | 12/2004 | Ouyang et al. |
| 2005/0086119 | A1 * | 4/2005 | Komuro et al. ............. 705/26 |

(Continued)

OTHER PUBLICATIONS

"Ad Words" Wikipedia, the Free Encyclopedia [online] Nov. 25, 2007 <URL:htto://en.wikinedia.orgh,viki/Advv'Oras> [retrieved Mar. 22, 2009], 6 pages.

(Continued)

*Primary Examiner* — Fadey Jabr
(74) *Attorney, Agent, or Firm* — Fish & Richardson P.C.

(57) ABSTRACT

The price of digital content is set by a pricing module using data obtained from a statistics module. The statistics module includes historical information about a content author's previous works, including demand for those works, and tracks data such as how many downloads are requested for the current content being priced, how many users are watching or listening to previews of the digital content, and where users are located. The pricing module may make content available for free initially; alternatively an initial non-zero price is chosen. The pricing module increases the price and observes changes in demand to determine a best-fit demand curve. Once the best-fit demand curve is determined, a price for the content is selected to maximize revenue. As the demand curve shifts, the price is adjusted to maintain optimal demand. Price is also adjusted proactively based on demand predictions determined according to statistical and historical data.

15 Claims, 8 Drawing Sheets

U.S. PATENT DOCUMENTS

| | | | |
|---|---|---|---|
| 2005/0251484 A1 | 11/2005 | Hirayama et al. | |
| 2006/0004628 A1 | 1/2006 | Axe et al. | |
| 2006/0149681 A1 | 7/2006 | Meisner | |
| 2006/0271389 A1 | 11/2006 | Goodman | |
| 2006/0276174 A1 | 12/2006 | Katz et al. | |
| 2007/0033133 A1 | 2/2007 | Pishevar et al. | |
| 2007/0124259 A1 | 5/2007 | Sussman et al. | |
| 2007/0243509 A1 | 10/2007 | Stiebel | |
| 2007/0271187 A1* | 11/2007 | Kurihara et al. | 705/51 |
| 2007/0271202 A1 | 11/2007 | O'Connor | |
| 2007/0282669 A1 | 12/2007 | Bachman et al. | |
| 2007/0294131 A1 | 12/2007 | Roman et al. | |
| 2008/0004939 A1 | 1/2008 | Li et al. | |
| 2008/0021847 A1 | 1/2008 | Schwartz et al. | |
| 2008/0040203 A1 | 2/2008 | Ivanov et al. | |
| 2008/0090551 A1 | 4/2008 | Gidron et al. | |
| 2008/0154633 A1 | 6/2008 | Ishibashi et al. | |
| 2008/0215467 A1 | 9/2008 | Huffman et al. | |
| 2008/0281662 A1 | 11/2008 | Ginsburg et al. | |
| 2010/0138690 A1 | 6/2010 | Pilgrim et al. | |

OTHER PUBLICATIONS

"eBay" Wikipedia, the Free Encyclopedia [online] Oct. 11,2007 <URL: hl1R__~tL~g!lyjkj.Q~18 lj2''.&r1?i}yjJsjL~b1!Y> [retrieved Mar. 22, 2009], 18 pages.

Mekauskas, Jim, "Should Targeting Cost More" iMedia Connection, iMedia Communications, Inc. [online] Jul. 15,2004 <URL: http://w'''wwoimediaconncction.cmn/content/38l3.asD> [retrieved Aug. 6, 2009], 3 pages.

"PageRank" Wikipedia, the Free Encyclopedia [online] Jan. 1, 2007 <URL: http://en.wikipedia.org/wiki/pagerank> [retrieved Mar. 22, 2009], 7 pages.

"Reverse Auction" Wikipedia, the Free Encyclopedia [online] Nov. 16, 2006 <URL: http://en.wikipedia.org/wiki/reverse auction> [retrieved Mar. 22, 2009], 4 pages.

Shapiro et al., "Versioning: The Smart Way to Sell Information," Harvard Business Review, Nov.-Dec. 1998, 10 pages.

Shapiro et al., "Versioning: The Smart Way to Sell Information," HBR OnPoint Enhanced Edition, Harvard Business Review, 2000, 12 pages.

Buchanan, Matt, "Amazon Invests in Demand-Based Pricing Digital Music Store," Gizmodo.com [online], Aug. 9,2007, Retrieved from the Internet: <http://gizmodo.com!gadgets/facts+speculationlamazon -invests-in -demand+based -pricing -digitalmusicstore-287632.php>, (retrieved on Mar. 11, 2010), 1 page.

Office Action for U.S. Appl. No. 11/857,296 dated Apr. 15, 2010. 14 pages.

Office Action for U.S. Appl. No. 11/857,296 dated Oct. 12, 2010. 15 pages.

Office Action for U.S. Appl. No. 11/857,296 dated Aug. 11, 2011. 15 pages.

Office Action for U.S. Appl. No. 11/857,296 dated Nov. 30, 2011, 2011. 9 pages.

* cited by examiner

Content

Name: Big Band Lesson 3 — 504

Type: Video — 506

Access: ● Public  ◉ Invitation Only — 508

Pricing

[X] Minimum Price — 512
[ ] Maximum Price

Description: Enter description of content here — 510

Submit

Cancel

AUTOMATICALLY ADAPTIVE PRICING FOR DIGITAL GOODS

CROSS REFERENCE TO RELATED APPLICATION

This application is a continuation of U.S. patent application Ser. No. 11/857,296 filed Sep. 18, 2007, which claims the benefit of U.S. Patent Application Ser. No. 60/826,045, filed Sep. 18, 2006, both of which are incorporated by reference.

BACKGROUND

This disclosure relates generally to digital data processing in the context of providing and pricing digital goods on a network.

Wide area networks such as the Internet have provided content creators with unprecedented access to potential consumers of their content. Many web sites exist, for example, as places for musical groups, movie makers, authors, and other artists to post content for subsequent download by consumers, either for free or at a cost to the consumer. This practice usually requires content creators to weigh financial reward against the ability to publicize their goods. Given the limited resources and lack of marketing expertise of many of these content creators, setting an appropriate price point for their creations can be difficult.

SUMMARY

The instant specification provides a system and methods for automatic adaptive pricing of digital goods, which can include audio content, video content, or a combination of audio and video content. Movies, TV shows, home-made movies, video games, and computer applications are contemplated for distribution.

In one approach described here, content authors upload content to a content server, and the content can then be downloaded by users of the system. The price of the content is set by a pricing module that applies data obtained from a statistics module to preference criteria, some or all of which are specified by the content authors. The statistics module includes historical information about the content author's previous works, including demand for those works, and additionally tracks data such as how many downloads are requested for the current content being priced, how many users are watching or listening to previews of the digital content, and where users are located.

Preference criteria of the pricing module can indicate preferences of the content author, for example, that would favor demand at the expense of revenues, that would favor revenues at the expense of demand, or that would balance demand and revenues. As one example, the content author may be a new artist who wants to gain attention, and will thus prefer to maximize distribution of their works even if they have to charge less. In contrast, a more established author may have no worries about attracting attention, and may thus be able to charge more and thus gain more profit.

In one implementation, the pricing module makes content available for free initially, though alternatively an initial non-zero price can be chosen. The pricing module then changes, either by increasing or decreasing, the price and observes resulting changes in demand in order to determine a best-fit demand curve for the content. Once the best-fit demand curve is determined, a price for the content is selected in order to increase or maximize revenue. As the demand curve shifts over time, the price can be adjusted to maintain optimal demand. Price is also adjusted proactively based on demand predictions determined according to statistical and historical data.

The figures depict example embodiments for purposes of illustration only. One skilled in the art will readily recognize from the following discussion that alternative embodiments of the structures and methods illustrated herein may be employed without departing from the principles of the inventions described herein.

DETAILED DESCRIPTION

Figure 1:
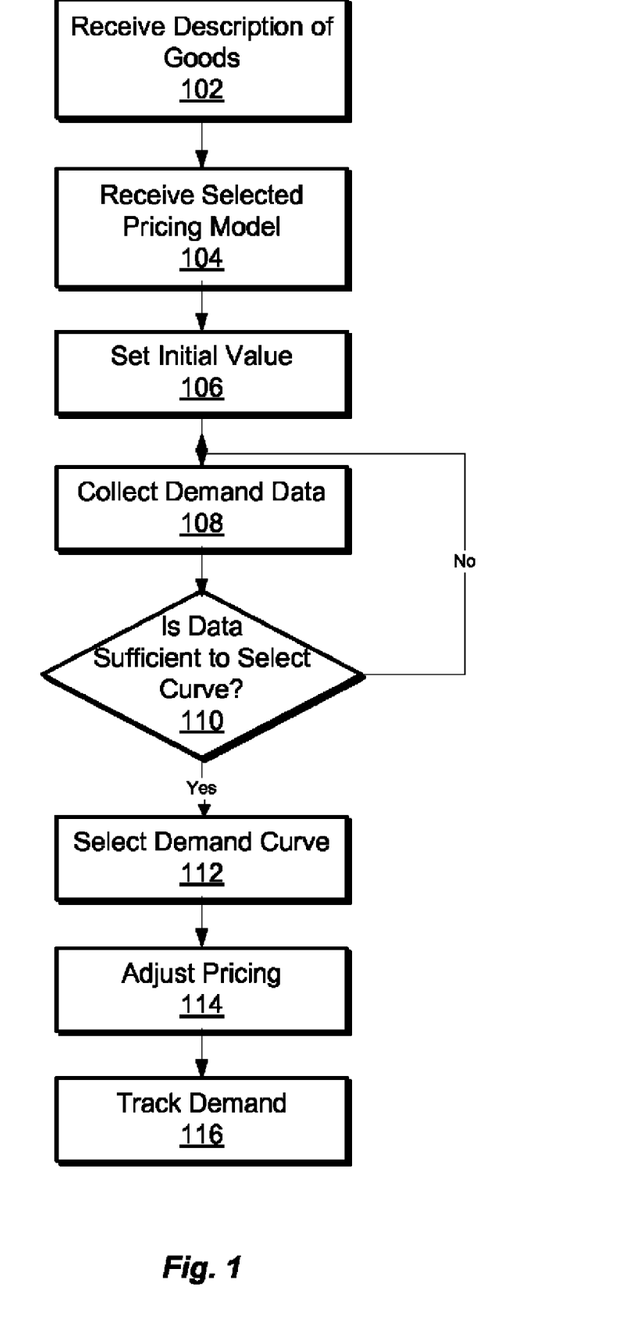
FIG. 1 is a flow chart showing a computer-implemented method for automatically adaptive pricing.

FIG. 1 shows a computer-implemented method for automatic adaptive pricing of digital goods. In general, the illustrated method involves receiving instructions for the pricing of the digital goods, where the instructions may direct that pricing of the goods changes over time. For example, the prices can fall over time so that the goods follow a demand curve downward. In this manner, consumers who most value the digital goods can obtain them at an early time but may have to pay a bit more, whereas consumers who demand the good less may have to wait but can save some money.

At an initial step of the method, digital data describing digital goods to be distributed and criteria for distribution are received (Step 102). A description of the digital goods includes at least information identifying a type of digital goods, for example, movies, TV shows, songs, video games, written articles, and computer applications. Additional information can be included, such as information required to process and present the goods.

A description of criteria for distribution includes information specifying one or more target revenues, one or more target demand levels, or one or more combinations of target revenue and target demands. In one implementation, the information specifies one of the following options: (i) demand is to be maximized; (ii) revenue is to be maximized; or (iii) some compromise between (i) and (ii) is to be applied in adjusting price. A user interface can allow selection of these options by displaying a slider, on a first end of which demand would be maximized, and on a second end of which revenue would be maximized. Positions between the ends would correspond to various degrees of compromise. When the slider of closer to the first end, for example, demand (while not maximized) would be favored over revenue in adjusting price.

A pricing model can then be selected based, at least in part, on the type of digital goods to be distributed (Step 104). Multiple pricing models may be made available for selection, for example, one for each type of digital good. Demand usually depends on the type of digital good at issue, and having different pricing models for different types of digital goods will generally produce more accurate modeling of demand. In many situations, supply for the described digital goods may be virtually endless (e.g., because it is in a digital form that can be identically copied) and, hence, demand would not depend on supply. The goods may also be limited in certain ways, such as by being distributed on physical media that is finite.

At least one of the pricing models includes multiple demand curves that are different from each other in that they are based on different mathematical functions. One curve, for example, can be based on a simple linear demand function while another can be based on a logarithmic function. Moreover, the different demand curves can include a same mathematical function offset by different degrees. One curve, for example, can be $y=a/x+b$ and another can be $y=a/x+d$, where d and b are different values. A demand curve can be theoretical or empirically derived from measured data.

In addition, pricing models may take more complex forms. For example, certain pricing models may be determined from empirical data regarding demand and pricing for particular goods. For example, the demand patterns for new release motion pictures are tracked closely, and it is know that opening weekend "gross" is very large, and then falls off quickly for subsequent weekends (unless an Oscar is won). Similar demand patterns may be observed for various digital media that may be purchase on-line, such as on demand movies and the like. The demand "curve" in such a situation may be described by a formula or by various points, such as a different point for each months or week during a release cycle for a product.

At box 106, the goods are made available according to the defined pricing model. For example, a base price for the goods may be applied to a formula for modifying the price, and the computed price may be displayed to potential purchasers of the good, such as when the good is shown in an on-line catalog or at the time of check-out. The displayed price may be generated at run time after a user requests information about a product, or may be more static, and updated periodically on a web page (e.g., daily or weekly). The price may also vary up and down, such that the price increases at some point. In addition, the price may be subject to two different formulas or definitions. For example, a price for a good may decrease linearly over a number of weeks, but the good may cost more in the evening than it does during the daytime (e.g., reflecting the fact that people may be more willing to pay additional money to obtain content during "prime time"). Such a pricing curve may thus look like an undulating line having an overall downward slope.

At box 108, adjustments are made to the price. The adjustments may occur at a particular time or upon the occurrence of another event. For example, a price may decrease according to a linear downward line, with the price change occurring constantly, at midnight each night, or once a week. Alternatively, the price may change after a certain number of a good has been sold. For example, an artist may want to charge a first, low price for a first 100 purchasers, a second, high price for the next 1000 purchasers, and a third, slight lower price for the remaining purchasers. New pricing may be checked each time a user seeks a price, or only at particular times or events.

At box 110, the creator of the product reviews the progress of sales and revises the pricing model. For example, perhaps sales have been slower than expected. In such a situation, the creator may lower the current price and/or may increase the downward slope of a line defining pricing for the product. Such changes may also be made automatically, such as when a content creator chooses a pricing model that defines predetermined reactions to demand (e.g., by adjusting the pricing curve downward if sales are below expected sales).

Figure 2:
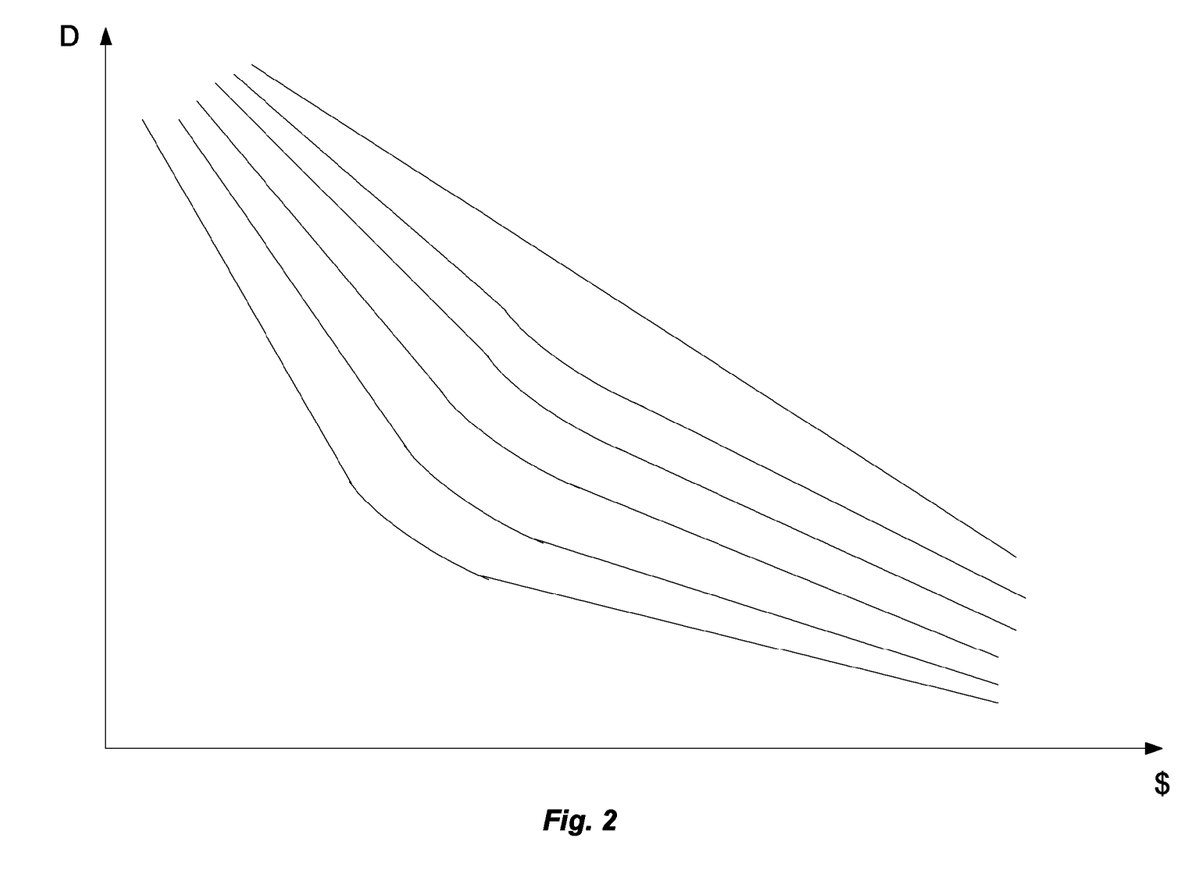
FIGS. 2 and 3 depict example pricing models.
Figure 3:
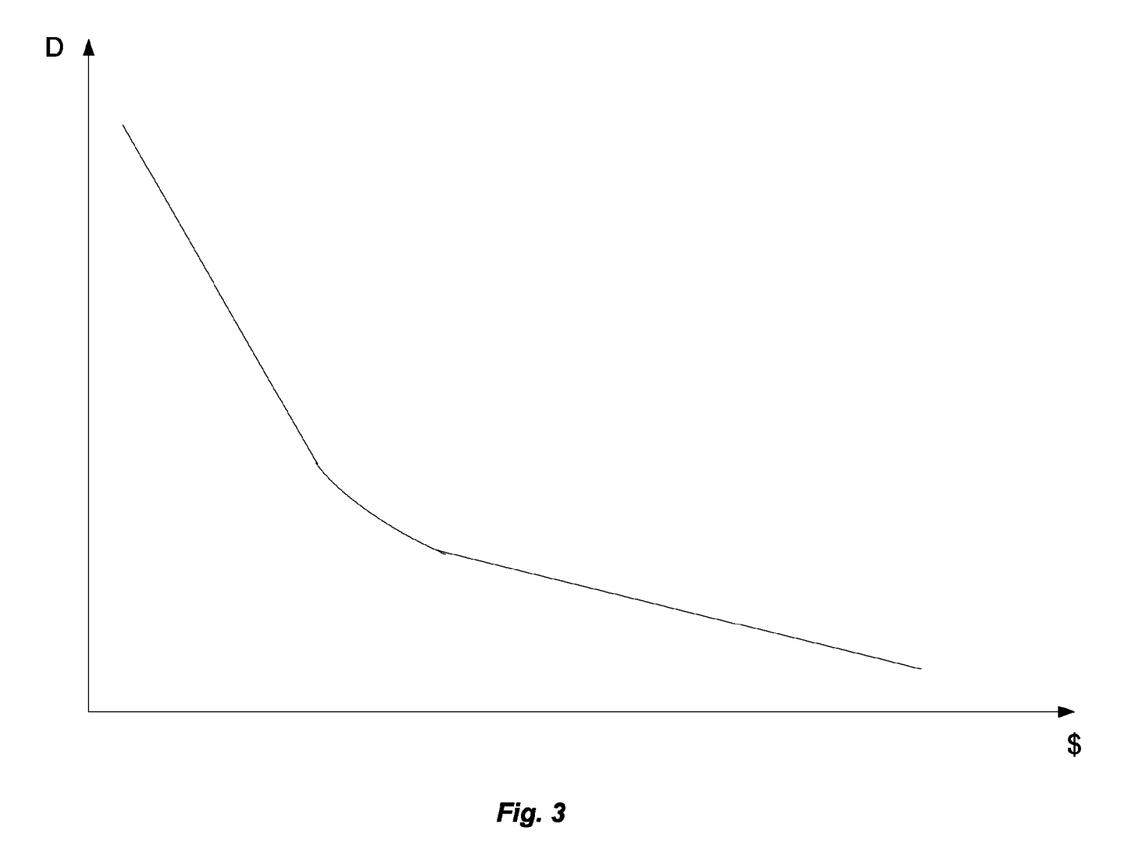

FIG. 2 shows an example of a pricing model having multiple demand curves. In the depicted model, the x axis represents price, and the y axis represents demand. The multiple demand curves, in the pricing model depicted, form a contiguous surface that represents demand over price. Such demand curves may represent levels of demand for various similar products, and may in turn be selected by users in establishing pricing profiles. For example, a pricing profile may follow along a demand curve at a rate specified by the user, so that, for example, the price falls by a set amount each week, or the price changes according to a time-based formula. However, as shown in FIG. 3, the pricing model can have demand curves that do not form a contiguous surface.

An initial value for current price is set for each unit of distribution (Step 106 of FIG. 1). Distribution may be quantified in a variety of manners. For example, a unit of distribution can be an instance of download of content to a client machine, an instance of play or presentation of content, a session of play of a computer game, or an instance of execution of a computer application. The initial value can be set by default and can be any value appropriate for the content in accordance with statistical data, which can be historical. In one implementation, the initial unit price is zero.

Demand data is collected for the current price for a period of time (Step 108). Demand data includes at least the number of units of distribution made during the given time period. Optionally, pricing is incremented during the period so that the number of data points for demand can be increased.

A determination is made regarding whether there is sufficient demand data to select one of the demand curves of the pricing model (Step 110). Thresholds for the determination can be established based on empirical information. For example, if experience indicates that 100 data points during the period is sufficient to select an appropriate demand curve, then the threshold is set at 100 data points. A process for determining whether an appropriate demand curve was selected is described in more detail below.

If it is determined that there is not sufficient data, then step 108 is repeated. Otherwise, a demand curve is selected (Step 112). Selection can be made based on any suitable curve fitting technique.

Once a demand curve is selected, pricing is adjusted based on the criteria received in step 102 (step 114). Demand is tracked to provide feedback on price adjustment and to affirm that the currently selected demand curve is still the most accurate of those in the currently selected pricing model (step 116).

A demand curve can be deemed to be accurately selected if, during step 116, a curve derived from the collected demand data tracks the selected demand curve in accordance with one or more criteria for comparing two functions. The criteria can include, for example, a comparison of the slopes and the values of the two curves for a given range of time. Also, a degree of fit between the two curves may be determined by various appropriate techniques.

Figure 4:
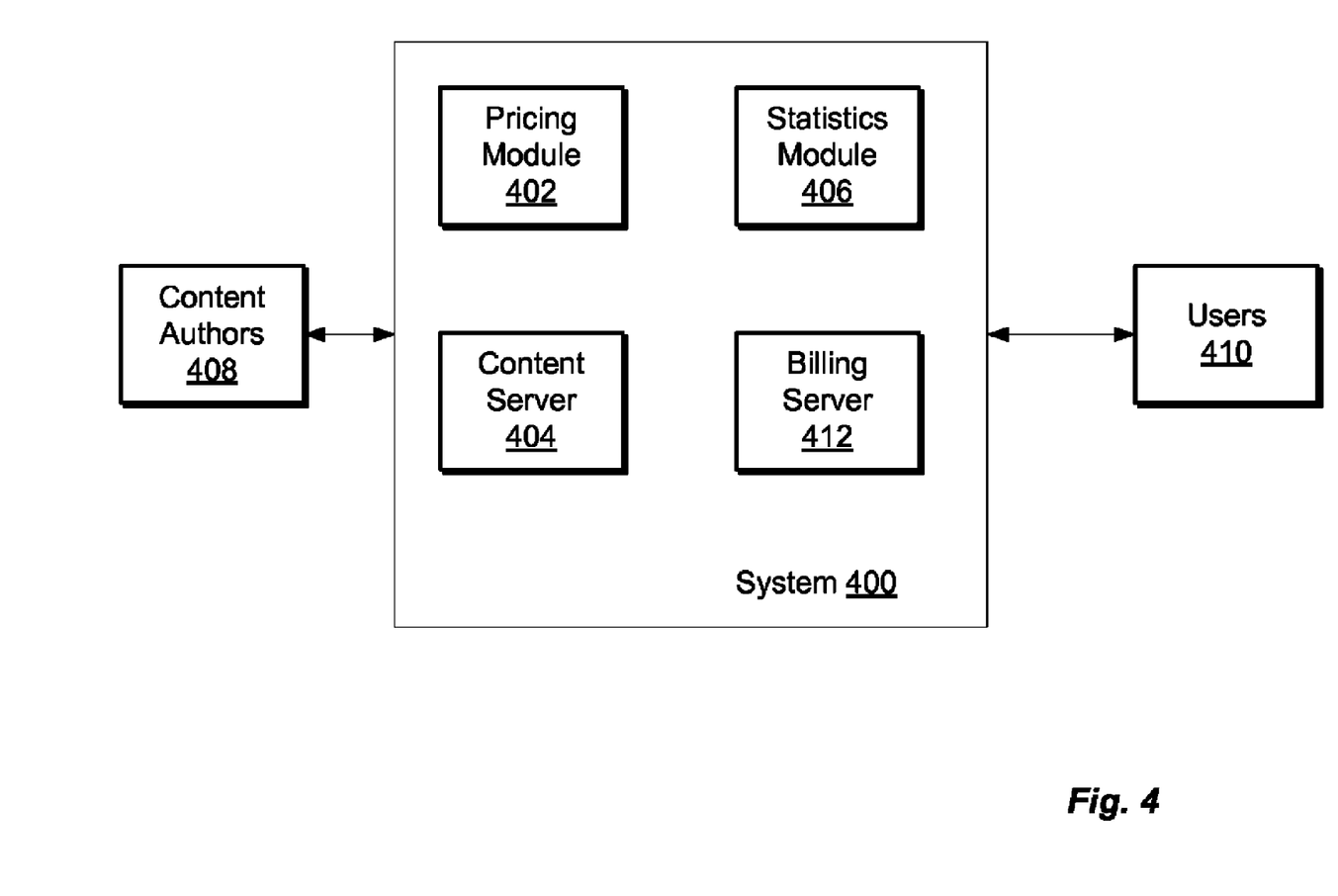
FIG. 4 is a block diagram illustrating a system for providing automatically adaptive pricing for digital goods.

FIG. 4 illustrates a system 400 for providing adaptive pricing of digital goods in accordance with one implementation of the present invention. System 400 includes a pricing module 402, a content server 404, a statistics module 406, and a billing server 412. Also shown in FIG. 4 are content authors 408 and users 410 who upload and download digital goods from system 400, respectively.

Content authors 408 upload content to content server 404 of system 400. Uploaded content includes audio, video, text and any other media suitable for distribution. In one embodiment, content authors 408 establish accounts with system 400. Information stored by system 400 in association with a content author's account includes bibliographic information about the author including, for example, the author's name or pseudonym, location, age, and previous works. As will be appreciated by those of skill in the art, additional information can also be maintained in association with an author's account. For example, a profile about the author may be stored and made available for review, as may public comments on the author and/or the author's works and photos or other information by or about the author.

Figure 5:
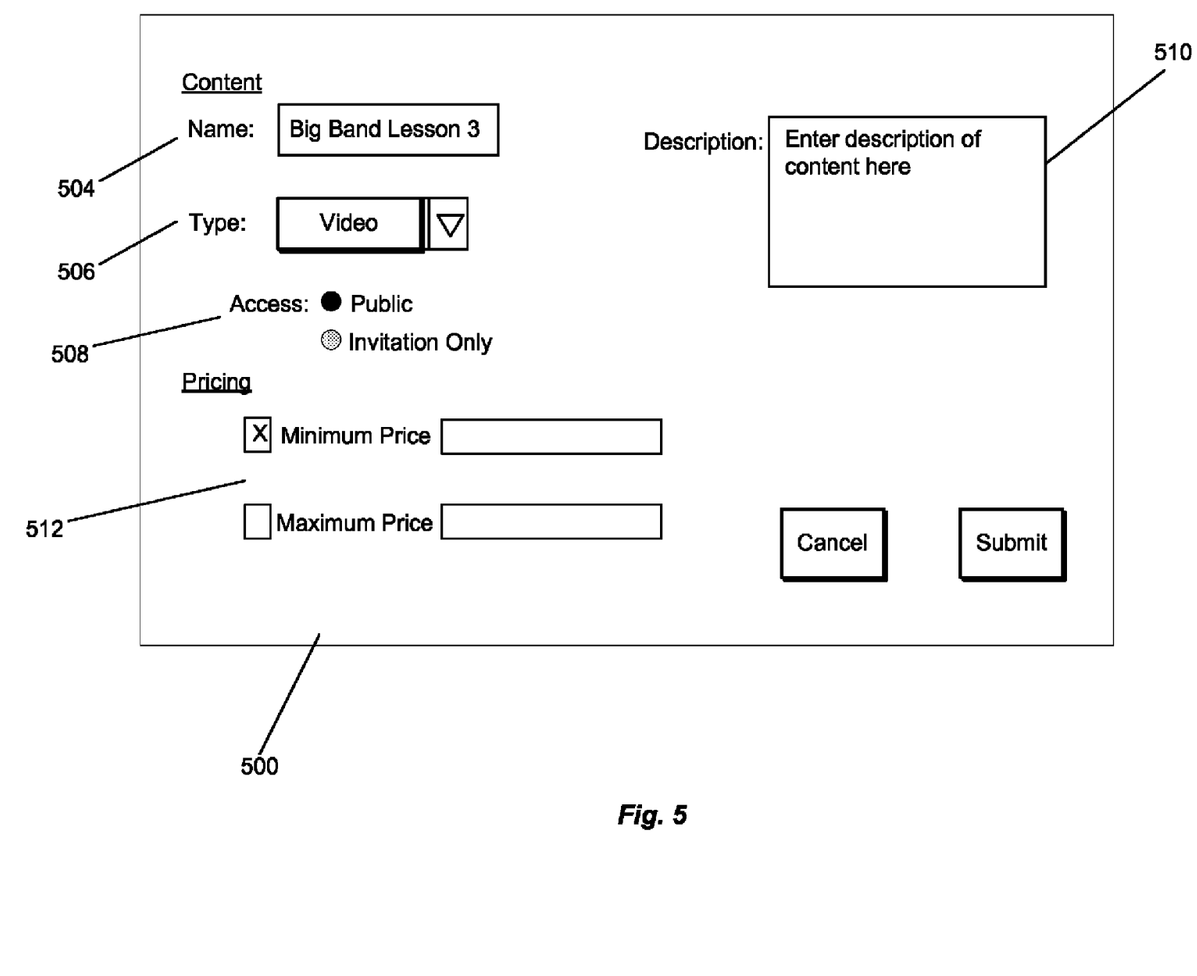
FIG. 5 illustrates a user interface for providing content description and pricing preferences for digital content.

When a content author 408 uploads content to system 400, she is in one implementation provided with a configuration page 500 such as the one illustrated in FIG. 5. The configuration page 500 may be displayed, for example, as a web page by a standard web browser. The author can use the configuration page to enter information about the uploaded content such as its name 504; type of content 506, e.g., audio, video, text, etc.; access restrictions 508, such as whether the file should be viewable by any user or whether only invited users should be allowed to access it; and a textual description 510 of the content, including keywords that describe the content. In alternative embodiments, additional descriptors may be included to provide information to consumers about the content. For example, thumbnail images of the content (e.g., freeze frames from videos, book covers, or album covers) may be attached at the page for later display to other users, as may snippets of the content such as a short piece of audio or video that can be used to audition the content to other users.

The configuration page 500 of FIG. 5 includes a selection of a pricing model 512 available to the content author 508. In the illustrated example, the content author can choose a minimum price to be charged to users for downloading her content, and can also choose a maximum price to be charged, each as described further below. In alternative embodiments, the content author can also specify a target number of downloads desired over a period, and an initial selling price, in order to override the optimization that would otherwise be performed by system 400.

Once the author has completed the configuration, the page is submitted. Content server 504 preferably also creates a sample portion of the content, referred to as a trailer. In the case of a video, the trailer may be a small snippet of the video; similarly, for audio or text the trailer may be a few seconds of audio or a few pages of text. As noted above, the trailer may also be provided by the author.

Using information such as logging, transaction or other reporting functionality of content server 404, pricing module 402 and billing server 412, statistics module 406 maintains statistics about content uploaded to content server 404, including how long ago the content was uploaded; a number of times the content has been purchased by users 410; the location of users who have purchased the content; how many times a sample portion of the content, known as a trailer, has been viewed or listened to by users; and how much of the trailer was actually viewed or listened to when the trailer was provided. Statistics module 406 also calculates a historical download average for content authors 408 who have previously distributed content through system 400. Statistics module 406 also infers historical patterns for different categories of content, e.g., audio, video, etc., and for different types of content within a category—for example, a historical download average for horror movies, a historical download average for country music songs, and the like. These historical averages enable pricing module 402 to use information about content such as its category and keywords in predicting demand for the content.

Billing server 412 interacts with users 410, handles transaction functions in order to provide users 410 with content supplied from content server 404 at a price determined by pricing module 402, and provides information about purchases to statistics module 406 for tracking purposes.

Pricing module 402 determines, for a particular content item during a particular time interval, what to charge users 410 to download the content item.

In one embodiment, pricing module 402 attempts to determine a selling price for the content that that will maximize revenue. Initially, the pricing module 402 sets the price for the content to be zero, i.e., the content is free. This recognizes that since the content is new, it is not yet popular, and users 410 will be reluctant to pay for unknown content. As the number of downloads of the content increases, as reported by statistics module 406, pricing module 402 raises the price of the content by an incremental amount, for example by $0.01, $1.00, etc. In one embodiment, pricing module 402 adjusts the price of the content in near-real time, for example every minute. In another embodiment, the price is adjusted once per hour, or once per day, or once per week. The frequency at which the price is adjusted can vary without loss of generality, as will be appreciated by those of skill in the art.

Figure 6:
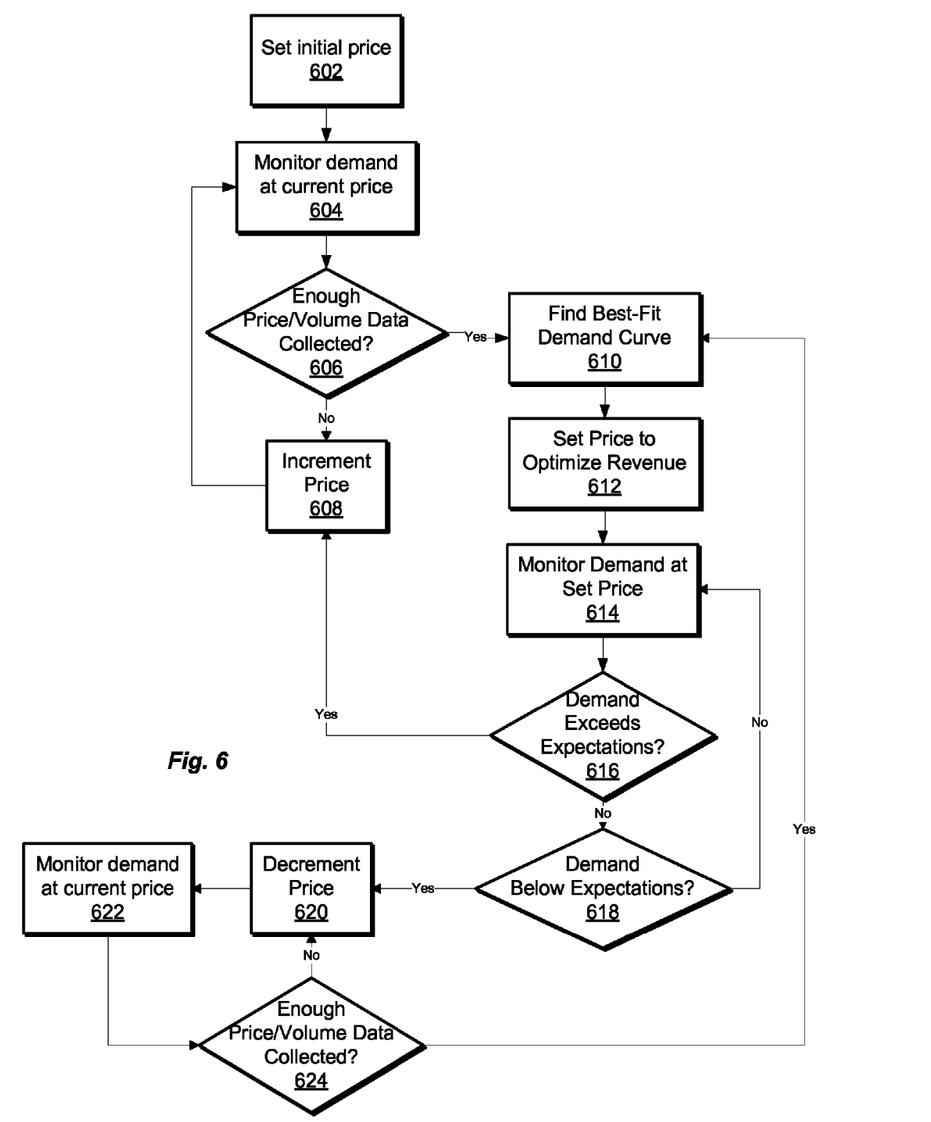
FIG. 6 is a flowchart illustrating a method for determining a price for digital goods.

FIG. 6 illustrates a method for setting a price for digital content in accordance with one implementation. Initially, pricing module 402 sets 602 the price to be zero, and monitors 604 demand for the content for a time interval. Next, pricing module 402 determines 606 whether it has obtained enough data points to construct a best-fit demand curve. Initially, only one data point is available (demand at a price of zero), so more data is needed. Accordingly (e.g., because demand at a zero price says little about elasticity of demand), pricing module 402 increments 608 the price charged for the content, and returns to step 604. Once pricing module 402 determines 606 that it has collected enough data to construct or select a best-fit curve, it proceeds 610 to do so. As will be appreciated by those of skill in the art, collecting more data points allows a more accurate demand curve to be determined, but at a cost of requiring more time intervals or transactions in which to collect the data. Accordingly, the number of data points used can be made selectable by the operator of system 400 in one implementation, or by content author 408 in an alternative implementation. Techniques for establishing a best-fit demand curve based on observed price and sales volume information are well known in the art, for example by using a least-squares method on the observed data.

Once the best-fit demand curve has been determined, pricing module 402 then sets 612 the price for the digital content to maximize revenue according to the curve.

In an alternative embodiment, pricing module 402 sets the price for the digital content at a price other than that which will maximize revenue. For example, if a maximum price has been specified for the digital content, as described above with respect to FIG. 5, and the price that would result in greatest revenue exceeds the maximum price, pricing module 402 sets the price at the maximum allowed price. In addition, other reasons such as business logic rules, may compel the price to be set differently. For example, if a business logic rule requires all prices to have a value of some variable dollar amount and a fixed cents amount of "99", then a revenue-maximizing price of $4.01 might instead be replaced in favor of a price of $3.99. Those of skill in the art will appreciate that the method described above can be used to beneficially increase revenue even if constraints prevent the revenue-maximizing price from being selected.

In other instances, an other-than-revenue-maximizing price may be desired. For instance, for an author that is new to a market, the author may prefer to charge less than would maximize current revenue so as to increase market penetration (and hopefully regain the lost revenue in future revenue from future products). The author may choose to follow exemplary pricing curves for such situations, with the particular curve that is selected by the system to be determined by initial demand for a product. Thus, for example, the author may identify himself or herself as seeking a particular "model" of behavior with a pricing selection. Such a model may be associated with one or more demand curves, and initial sales data may be tracked to determine which of the demand curves for that model is appropriate, and to thereby determine a pricing strategy for the author.

As content becomes more or less popular with time, the demand curve may shift up or down for a given price. Pricing module 402 continues to monitor 614 the demand (measured, for example, by the number of downloads) to determine if demand exceeds 616 or fails to meet 618 expectations consistent with the best-fit curve. If demand exceeds 616 expectations, this suggests that the demand curve has shifted upwards, and that the optimal price (i.e., the price that maximizes revenue or other parameters preferred by the author) is therefore higher. Pricing module 402 accordingly returns to step 608, incrementing 608 the price charged and monitoring the results in order to establish a new best-fit demand curve.

Conversely, if demand is below 618 expectations, this suggests that the demand curve has shifted downward, and pricing module 102 therefore decrements 320 the price charged and monitors 622 demand at the new lower price. The decrementing process continues until 624 pricing module 402 has collected enough data points to establish a new 610 best-fit demand curve.

In addition to responding to observed changes in demand, system 400 can optionally use statistical information from statistics module 406 combined with information available about the content in order to make proactive changes in pricing based on predictions about future demand. Note that information about the content can be provided by the content authors 408, or obtained through other mechanisms, such as through tagging by others. For example, data from statistics module 406 might illustrate that demand for horror movies tends to increase by a certain percentage after a certain amount of time—perhaps 15% after three days. Accordingly, pricing module 402 in one embodiment anticipates the demand change by raising the price of a particular horror movie after three days—or just prior to three days—to continue to maximize revenue based on the predicted change in demand. More granular data can also be tracked by statistics module 406, thus leading to even more accurate predictions. Continuing with the example above, the statistical data may suggest that on average, horror movies become 15% more popular after three days, but that this trend does not apply to consumers in South Korea where, to the contrary, demand actually falls by 20% after only two days of availability. Pricing module 402 can then use this information to adjust the price of the content to fit the predicted demand curve for the content by a particular segment of the population—in this case, raising the price of the horror movie for most consumers while at the same time lowering the price for those consumers in South Korea.

Figure 7:
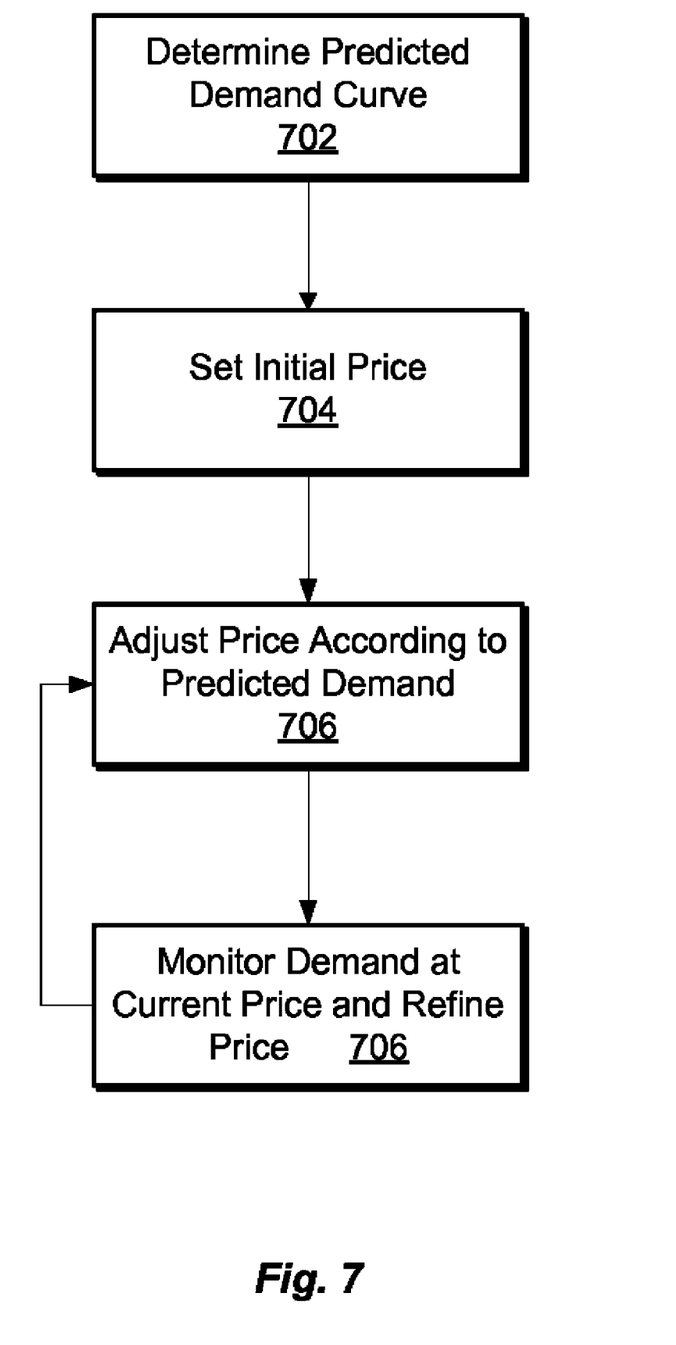
FIG. 7 is a flowchart illustrating a method for proactively adjusting prices in view of predicted demand.

FIG. 7 illustrates a method for proactively adjusting prices in view of predicted demand. Predicted demand curves for a plurality of times are determined 702 based on available statistical data relevant to the content. Next, pricing module 402 sets 704 an initial price for the content. The initial price may be zero, or may be determined as described below. For each time period, pricing module 402 adjusts 706 the price according to the determined predicted demand curve for that period. After the price has been adjusted, it can then be further refined 706 as illustrated in FIG. 6 with respect to steps 604-624.

In one implementation, an initial starting price other than zero can be chosen based on statistical information supplied by statistics module 406. For example, if previous content provided by the same content author 408 has generated high demand, system 400 infers that new content from the same author will have some extra degree of initial demand because of the author's reputation. Accordingly, the initial price set for download of the author's content may be incremented by some amount. In one embodiment, the amount is determined by finding the average price paid for all content provided by the content author over time. In another embodiment, the historical average price is discounted by some amount, e.g., 50%. Those of skill in the art will appreciate that other methods can also be used to set an initial price for content by previously-known content authors who are providing new content. Alternatively, the content type may be one that is statistically more popular than others—for example, horror movies may be known by statistics module 406 to be more popular than other types of movies, and if content type information is available it can be used to set a higher initial price for horror movies than for other types of movies. Similar analyses can be done on other characteristics of the content, such as the names of actors in a movie, director, and the like.

In one embodiment, additional proactive pricing alterations are made by pricing module 402. For example, statistics module 406 tracks the number of times a trailer has been viewed or listened to for each content item. A rapid increase in the number of times a trailer is viewed suggests that knowledge of the content is spreading among users 410, which in turn predicts an increase in demand. Accordingly, pricing module 402 increments the price for the item to take advantage of the imminent increased demand. Conversely, a decrease in the number of times a trailer is viewed suggests waning interest in the item, and pricing module 402 decrements the price of the item to avoid future decreased sales volume. In addition, where trailers are streamed to users, the amount of the trailer actually viewed by a user is tracked by statistics module 106. Trailers viewed in their entirety signal that content is of a higher quality; trailers abandoned after a short while are indicative of lower quality. These quality indicators are then used to increment or decrement the price by pricing module 402, on the theory that higher quality leads to increased demand.

As indicated above, pricing module 402 in one embodiment is configured to charge users in one location a different price for the same content as it charges users in another location. Statistics module 406 uses information provided by billing server 412 to track the location of users 410 who download each content item. Where a statistically significant difference (as defined by the operator of system 400) is noted in demand for a particular item based on location of the users, pricing module 402 determines a separate best-fit demand curve for that location. For example, if a particular movie uploaded by a content author to system 400 is aberrantly popular in San Francisco, pricing module 402 will increase the price of the content for those users located in San Francisco. Corresponding price decreases can also be applied for users in a location where content is unusually unpopular.

Pricing module 402 in one embodiment takes as input constraints provided by a content author 408 or system 400 operator. For example, a content author 408 may specify that she does not want to charge more than a certain dollar amount, e.g., $10, for her content. Alternatively—or additionally—the content author may decide that she will not accept less than $1 for the same content. In such a case, although pricing module 402 will continue to find 610 a best-fit demand curve for the content, the maximum and minimum prices will be constrained to the floor or ceiling specified by the author or system operator.

The present invention has been described in particular detail with respect to a limited number of embodiments. Those of skill in the art will appreciate that the invention may additionally be practiced in other embodiments. The present invention also has application beyond audio and video to the pricing of other items available on a network such as the Internet where it is desirable to set price according to demand on a fluctuating basis.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of pricing module 402, statistics module 406, and so forth may be provided in many or one module.

Figure 8:
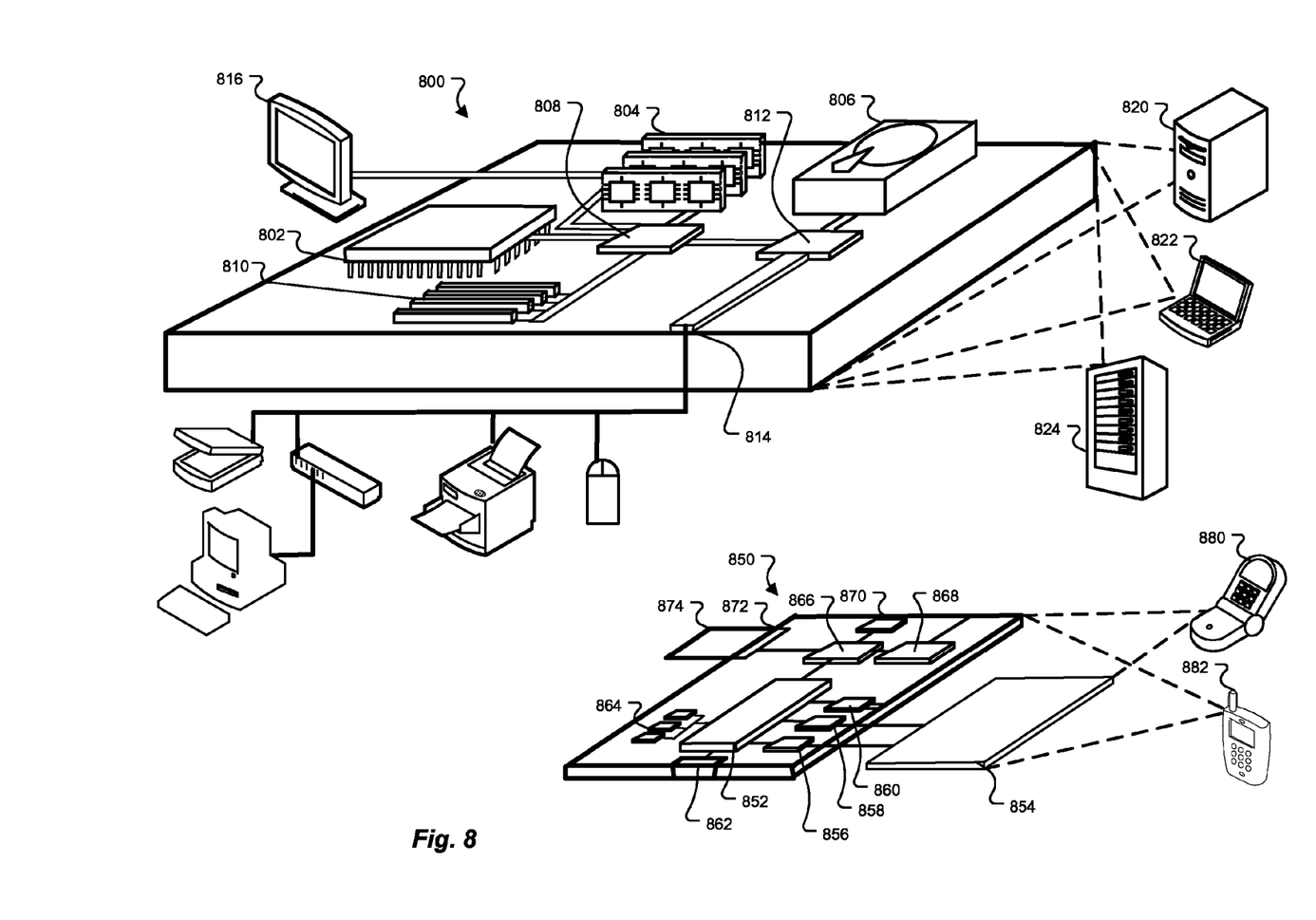
FIG. 8 shows an example of a computer device and a mobile computer device that can be used to implement the techniques described here.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method comprising:
setting, by a content distribution system that includes one or more computers, a price for the item of digital content;
providing, by the content distribution system, a promotional clip associated with the item of digital content;
collecting, by the content distribution system, viewing data for the promotional clip associated with the item of digital content comprising collecting data reflecting an amount of the promotional clip associated with the item of digital content that has been viewed by a user; and
adjusting, by the content distribution system, the price for the item of digital content based upon the collected viewing data for the promotional clip associated with the item of digital content comprising increasing or decreasing the price when the amount of the promotional clip associated with the item of digital content that has been viewed by the user is greater or less than a predefined amount of the promotional clip associated with the item of digital content.

2. The method of claim 1, wherein collecting viewing data for a promotional clip associated with the item of digital content comprises collecting a rate of viewings for the promotional clip associated with the item of digital content.

3. The method of claim 2, wherein adjusting the price for the item of digital content based upon the collected viewing data comprises increasing the price when the rate of viewing increases greater than a predefined rate.

4. The method of claim 2, wherein adjusting the price for the item of digital content based upon the collected viewing data comprises decreasing the price when the rate of viewings decreases less than a predefined rate.

5. The method of claim 1, wherein the promotional clip associated with the item of digital content comprises a movie trailer.

6. A system comprising:
one or more computers and one or more storage devices storing instructions that are operable, when executed by the one or more computers, to cause the one or more computers to perform operations comprising:
setting, by a content distribution system, a price for the item of digital content;
providing, by a content distribution system, a promotional clip associated with the item of digital content;
collecting, by a content distribution system, viewing data for the promotional clip associated with the item of digital content comprising collecting data reflecting an amount of the promotional clip associated with the item of digital content that has been viewed by a user; and
adjusting, by a content distribution system, the price for the item of digital content based upon the collected viewing data for the promotional clip associated with the item of digital content comprising increasing or decreasing the price when the amount of the promotional clip associated with the item of digital content that has been viewed by the user is greater or less than a predefined amount of the promotional clip associated with the item of digital content.

7. The system of claim 6, wherein collecting viewing data for a promotional clip associated with the item of digital content comprises collecting a rate of viewings for the promotional clip associated with the item of digital content.

8. The system of claim 7, wherein adjusting the price for the item of digital content based upon the collected viewing data comprises increasing the price when the rate of viewing increases greater than a predefined rate.

9. The system of claim 7, wherein adjusting the price for the item of digital content based upon the collected viewing data comprises decreasing the price when the rate of viewings decreases less than a predefined rate.

10. The system of claim 6, wherein the promotional clip associated with the item of digital content comprises a movie trailer.

11. A non-transitory computer-readable medium storing software comprising instructions executable by one or more computers which, upon such execution, cause the one or more computers to perform operations comprising:
setting, by a content distribution system, a price for the item of digital content;
providing, by a content distribution system, a promotional clip associated with the item of digital content;
collecting, by a content distribution system, viewing data for the promotional clip associated with the item of digital content comprising collecting data reflecting an amount of the promotional clip associated with the item of digital content that has been viewed by a user; and
adjusting, by a content distribution system, the price for the item of digital content based upon the collected viewing data for the promotional clip associated with the item of digital content comprising increasing or decreasing the price when the amount of the promotional clip associated with the item of digital content that has been viewed by the user is greater or less than a predefined amount of the promotional clip associated with the item of digital content.

12. The medium of claim 11, wherein collecting viewing data for a promotional clip associated with the item of digital content comprises collecting a rate of viewings for the promotional clip associated with the item of digital content.

13. The medium of claim 12, wherein adjusting the price for the item of digital content based upon the collected viewing data comprises increasing the price when the rate of viewing increases greater than a predefined rate.

14. The medium of claim 12, wherein adjusting the price for the item of digital content based upon the collected viewing data comprises decreasing the price when the rate of viewings decreases less than a predefined rate.

15. The medium of claim 11, wherein the promotional clip associated with the item of digital content comprises a movie trailer.

* * * * *